(12) United States Patent
Holberg et al.

(10) Patent No.: US 7,286,176 B2
(45) Date of Patent: Oct. 23, 2007

(54) CCD IMAGER ANALOG PROCESSOR SYSTEMS AND METHODS

(75) Inventors: Douglas R. Holberg, Wimberley, TX (US); Sandra M. Johnson, Buda, TX (US); Nadi R. Itani, Austin, TX (US); Argos R. Cue, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 695 days.

(21) Appl. No.: 10/820,577

(22) Filed: Apr. 8, 2004

(65) Prior Publication Data

US 2004/0189843 A1 Sep. 30, 2004

Related U.S. Application Data

(63) Continuation of application No. 09/283,112, filed on Mar. 31, 1999, now Pat. No. 6,720,999.

(51) Int. Cl.
H04N 5/222 (2006.01)
H04N 5/228 (2006.01)
H03M 1/12 (2006.01)
H03M 1/38 (2006.01)

(52) U.S. Cl. .............................. 348/333.01; 348/222.1; 348/572; 341/161

(58) Field of Classification Search ................ 348/572, 348/573, 14.12, 333.01, 333.11, 222.1; 341/131, 341/161; 382/299; 358/1.2
See application file for complete search history.

(56) References Cited

U.S. PATENT DOCUMENTS 6,252,536 B1 * 6/2001 Johnson et al. ............. 341/155

(Continued)

OTHER PUBLICATIONS

Kwok et al.; "Power Optimization for Pipeline Analog-to-Digital Converters"; May 1999; IEEE Transactions on Circuits and Systems—II: Analog and Digital Signal Processing; vol. 46, No. 5; pp. 549-553.*

(Continued)

*Primary Examiner*—John M. Villecco
(74) *Attorney, Agent, or Firm*—Steven Lin, Esq.

(57) ABSTRACT

A processing system for a charge coupled device (CCD) or CMOS imaging system includes a multi-mode, multiple current level, correlated double sample and variable gain (CDS/VGA) circuit for receiving data from a CCD system, subject to horizontal and vertical timing signals for the system which are locally generated by the processing system itself. The processing system particularly includes programmable timing circuitry for controlling the detection of pixel intensity values from elements of a two-dimensional pixel array, with a programmable low-frequency master vertical timing circuit driving a high-frequency horizontal timing circuit, wherein the vertical and horizontal timing signals are independently locally provided to the array from the analog processor actually sampling the array. The architecture of the processing system further includes a correlated double sampler, a black level clamp, and an A/D conversion module. The processing system includes a camera system for producing an imager signal, a correlated double sample (CDS) circuit for receiving data from an imager, a variable gain amplifier (VGA) having amplifiers of selectable current level to enable reduced data resolution, an analog-to-digital converter (ADC) having a selectable bit-width output and coupled to said VGA circuit, and a gain circuit coupled to said ADC. The single chip analog front end produces digitized CCD data in a bit formats corresponding to selected current level and data resolution. The VGA amplifier includes circuitry to enable selected data resolution levels respectively for still image capture and separate video display on another viewing screen.

15 Claims, 16 Drawing Sheets

U.S. PATENT DOCUMENTS

| | | | |
|---|---|---|---|
| 6,285,309 B1* | 9/2001 | Yu | 341/161 |
| 6,340,944 B1* | 1/2002 | Chang et al. | 341/161 |
| 6,532,370 B1* | 3/2003 | Underbrink et al. | 341/161 |
| 6,617,934 B1* | 9/2003 | Holberg et al. | 331/57 |
| 6,686,957 B1* | 2/2004 | Johnson et al. | 348/222.1 |
| 6,707,492 B1* | 3/2004 | Itani | 341/155 |
| 6,980,148 B1* | 12/2005 | Bahai | 341/161 |
| 7,009,548 B2* | 3/2006 | Chiang et al. | 341/161 |
| 7,068,319 B2* | 6/2006 | Barna et al. | 348/302 |
| 7,205,923 B1* | 4/2007 | Bahai | 341/161 |
| 2004/0125008 A1* | 7/2004 | Yamaji | 341/155 |
| 2005/0068218 A1* | 3/2005 | Kobayashi et al. | 341/161 |

OTHER PUBLICATIONS

Lewis, Stephen H.; "Optimizing the Stage Resolution in Pipelined, Multistage, Analog-to-Digital Converters for Video-Rate Applications"; Aug. 1992; IEEE Transactions on Circuits and Systems—II: Analog and Digital Signal Processing; vol. 39, No. 8; pp. 516-523.*

* cited by examiner

CCD IMAGER ANALOG PROCESSOR SYSTEMS AND METHODS

CROSS REFERENCE TO RELATED APPLICATIONS

This application is a continuation application of U.S. patent application Ser. No. 09/283,112 filed Mar. 31, 1999 now U.S. Pat. No. 6,720,999 entitled "CCD Imager Analog Processor Systems and Methods" having inventors Douglas R. Holberg, Sandra M. Johnson, and Nadi R. Itani.

This application is related to patent application Ser. Nos. 09/283,098, 09/282,524, 09/282,515, and 09/283,779, 09/282,523, respectively entitled "Phase Locked Loop Circuits, Systems, and Methods" having inventors Douglas R. Holberg and Sandra Marie Johnson, which has issued as U.S. Pat. No. 6,617,934 on Sep. 9, 2003; "Preview Mode Low Resolution Output System and Method" having inventors Douglas R. Holberg, Sandra Marie Johnson, and Nadi Rafik Itani, which has issued as U.S. Pat. No. 6,686,957 on Feb. 3, 2004; "Amplifier System with Reducable Power" having as inventor Nadi Rafik Itani, which has been abandoned; "Dynamic Range Extender Apparatus, System, and Method for Digital Image Receiver System" having inventors Sandra Marie Johnson and Nadi Rafik Itani, which has issued as U.S. Pat. No. 6,252,536; and "Successive Approximation Calibration Apparatus, System, and Method for Dynamic Range Extender" having inventor Nadi Rafik Itani, which has issued as U.S. Pat. No. 6,707,492 on Mar. 16, 2004; each of these above applications filed on even date herewith, and each incorporated herein by reference in its entirety.

BACKGROUND OF THE INVENTION

1. Field of the Invention

This invention relates to analog and digital processors and methods, and more particularly to analog and digital circuits, systems, and methods for charge coupled devices (CCDs), CMOS imagers, and cameras.

2. Description of the Related Art

Charge coupled device (CCD) camera systems are configured to capture signals according to many different CCD output formats and pixel configurations. One such CCD camera includes a sensor array, a high voltage CCD driver for driving the sensor array, and a DC-DC converter. The sensor array drives an analog processor which is in turn connected to a digital processor. The analog processor converts the signals received from the sensor array from an analog form into digital data. Such a camera produces a digital still image with up to 8 k×8 k pixels. The sensor array includes a grid of sensing elements arranged in a plurality of lines distributed across a vertical axis. Each line has a predetermined horizontal width. The CCD sensor array requires vertical and horizontal timing signals. Current CCD systems fail to have analog processors which are able directly to provide both analog and vertical timing systems to the CCD array. This makes it technically difficult to control the timing of a CCD array.

Further, many CCD arrays require the provision of several control currents to enable operation of the CCD array. Provision of there control currents is difficult to implement technically with the digital processing circuitry used to operate and control the associated CCD arrays. Accordingly, it is desirable to enable the convenient and controllable provision of desired control currents to a CCD array.

Many analog processors used with CCD systems use analog-to-digital converters having a limited dynamic range. Therefore, there is a need for a processor to have an extended dynamic range to be able to process the CCD output into digital formatted data to enable user controlled hardware or software data processing leading to production of viewable digital images.

There is a further need to control output resolution of the analog and digital subsystems in terms of bit-width. According to one known CCD format, in order to obtain a still image with acceptable resolution and contrast from a CCD, a minimum of 10 bits of resolution is desired. To practically capture a CCD image, the data read-out time from the CCD is very limited. Accordingly, one such front end interface which accepts CCD data for conversion into digital form operates typically up to 16 MHz with a 10-bit analog-to-digital converter. Such a camera can produce a digital still image with up to 8 k×8 k pixels.

The feature set available in known CCD camera systems is increasing to include enhanced functionality, as well as extended dynamic range. Such extended functionality comes at a price in terms of electronic complexity and power consumption. For example, some current camera systems include a liquid crystal display (LCD) screen to enable viewing of images in a real-time viewfinder. This requires the CCD and associated processing chips to run in a video mode and to remain powered up while the screen is in use. This can dissipate a large amount of power that tends to shorten battery life. In such an operational mode, front end circuitry is operated at a resolution level which is unnecessary for driving the relatively low resolution LCD display, thereby consuming power needlessly. Accordingly, there is a need to enable low power operation of the analog and digital subsystems in CCD camera and imager systems that convert analog data into digital signal forms for user applications. There is a further need for low power operation of analog and digital subsystems generally that convert analog data into digital signal forms.

SUMMARY OF THE INVENTION

According to the present invention, a processing system for a charge coupled device (CCD) or CMOS imaging system includes a multi-mode, multiple current level, correlated double sampler and variable gain (CDS/VGA) circuit for receiving data from a CCD system. The architecture of the processing system also includes a black level clamp and an A/D conversion module having a selectable bit-width output and coupled to said VGA circuit, and a gain circuit coupled to said ADC. The single chip analog front end produces digitized CCD data in a bit format corresponding to selected current level and data resolution. The VGA amplifier includes circuitry to enable selected data resolution levels respectively for still image capture and separate video display on another viewing screen. The processing system according to the present invention further includes timing circuitry adapted to control both vertical and horizontal timing of the sensor array elements in the CCD. The CCD requires bias voltages of various magnitudes, which are provided according to the present invention, including for example, a substrate bias voltage. According to the present invention, up to two CCD bias voltages are generated from currents supplied with an analog processor including first and second digital-to-analog converters. According to one embodiment of the present invention, the first and second digital-to-analog converters are controlled with signals provided by the user through serial interface circuitry.

According to a further embodiment of the present invention, a processing system for an imager device includes a sensor for producing an image signal, a correlated double sample (CDS) circuit for receiving data from an imager, a variable gain amplifier (VGA), an analog-to-digital converter (ADC) coupled to said CDS and VGA circuits for producing output signals of expanded dynamic range including but not limited to a thirteen bit wide digital output, a gain adjust block (GAB) coupled to said ADC, a black level adjustment circuit including a clamp setting, a compander circuit coupled to said GAB for reducing the output bit-width, a multiplexer permitting selection of output signals of selected bit-width, and a phase-lock-loop (PLL) for controlling a multi-sync timing generator including an analog clock generator (ACG). The processing system according to the present invention further includes timing circuitry adapted to control both vertical and horizontal timing of the sensor array elements in the CCD.

According to another embodiment of the present invention, a signal processing system (SPS) on an integrated substrate for a video camera includes analog front-end (AFE) circuitry with digital outputs selectable for multiple bitwidths and having selectable high and low resolution (preview) output modes, and digital signal processing system (DSPS) circuitry connected to the analog front-end (AFE) circuitry. According to the present invention, a signal processing system (SPS) for an imager device includes a camera system for producing an imager signal, a correlated double sample (CDS) circuit for receiving data from an imager, a variable gain amplifier (VGA), an analog-to-digital converter (ADC) coupled to the VGA circuit, a digital gain circuit (DGC) coupled to the ADC, and a compander circuit coupled to said DGC for reducing the output bit-width. According to the present invention, gain control of a signal processing system for an imager device includes a correlated double sampler, and variable gain amplifier circuit (CDSVGA) for receiving data from the imaging system, and a gain adjust block (GAB) coupled to said ADC for controlling the level of gain provided signals from the camera system according to the present invention. According to the present invention, signal processing circuitry for a video camera has first and second data processing subsystems including an analog front-end (AFE) and a digital signal processing system (DSPS) connected to the analog front-end (AFE). The AFE according to the present invention further includes timing circuitry adapted to control both vertical and horizontal timing of the sensor array elements in the CCD array.

The signal processing system according to the present invention performs signal processing functions for a CCD or CMOS imaging camera. A complete digital camera according to one embodiment of the present invention includes in part a sensor array, a vertical driver, a DC-DC converter, the AFE and the DSPS. The AFE data processing subsystem according to the present invention receives a CCD output from the CCD camera, performs analog signal processing, and produces a digital output which can be converted to a form suitable for image display. The processing system according to the present invention further includes timing circuitry adapted to control both vertical and horizontal timing of the sensor array elements in the CCD array. The DSPS data processing subsystem according to the present invention accepts the digital output of the AFE data processing subsystem, performs digital processing on the received digital output of the AFE, and according to one embodiment of the present invention outputs a data product suitable for presentation on a user selected display, without directly influencing CCD horizontal or vertical timing.

According to one embodiment of the present invention, a processing system for an imager device includes a camera system for producing a desired imager signal which operates in a reduced power or preview mode. Such a system according to the present invention includes a correlated double sample (CDS) circuit for receiving data from a selected imager, a multi-mode (selectably high or low current) variable gain amplifier (VGA), a low power mode analog-to-digital converter (ADC) having a selectable narrow bit-width output and coupled to said CDS circuit. The low power mode enables production of an ADC output signal of selectable higher or lower resolution. The processing system according to the present invention includes a gain adjust block (GAB) coupled to the ADC, a black level adjustment circuit including a predetermined clamp setting, a compander circuit coupled to said GAB for further reducing the output bit-width, a multiplexer permitting selection of output signals of selected bit-width, and a phase-lock-loop (PLL) for controlling a multi-sync timing generator including an analog clock generator (ACG). According to the present invention, the compander provides a bit-width reduction which compresses the output so that a smaller bit-width signal can retain the same dynamic range as a larger bit-width signal. The ADC output bit-width sacrifices only an acceptable level of resolution, in accordance with the present invention. According to one embodiment of the present invention, by reducing the resolution requirement of the camera system front end to a selected number of bits during a still camera viewfinder video mode of operation, the power dissipated by the camera system is reduced substantially. In particular according to one embodiment of the present invention, a signal processing system (SPS) on an integrated substrate for a camera has a reduced power preview mode. The camera includes analog front-end (AFE) circuitry with digital outputs selectable for multiple bit-widths and having selectable high and low resolution (preview) output modes, and digital signal processing system (DSPS) circuitry connected to the analog front-end (AFE) circuitry.

DETAILED DESCRIPTION OF THE PREFERRED EMBODIMENTS

Figure 1:
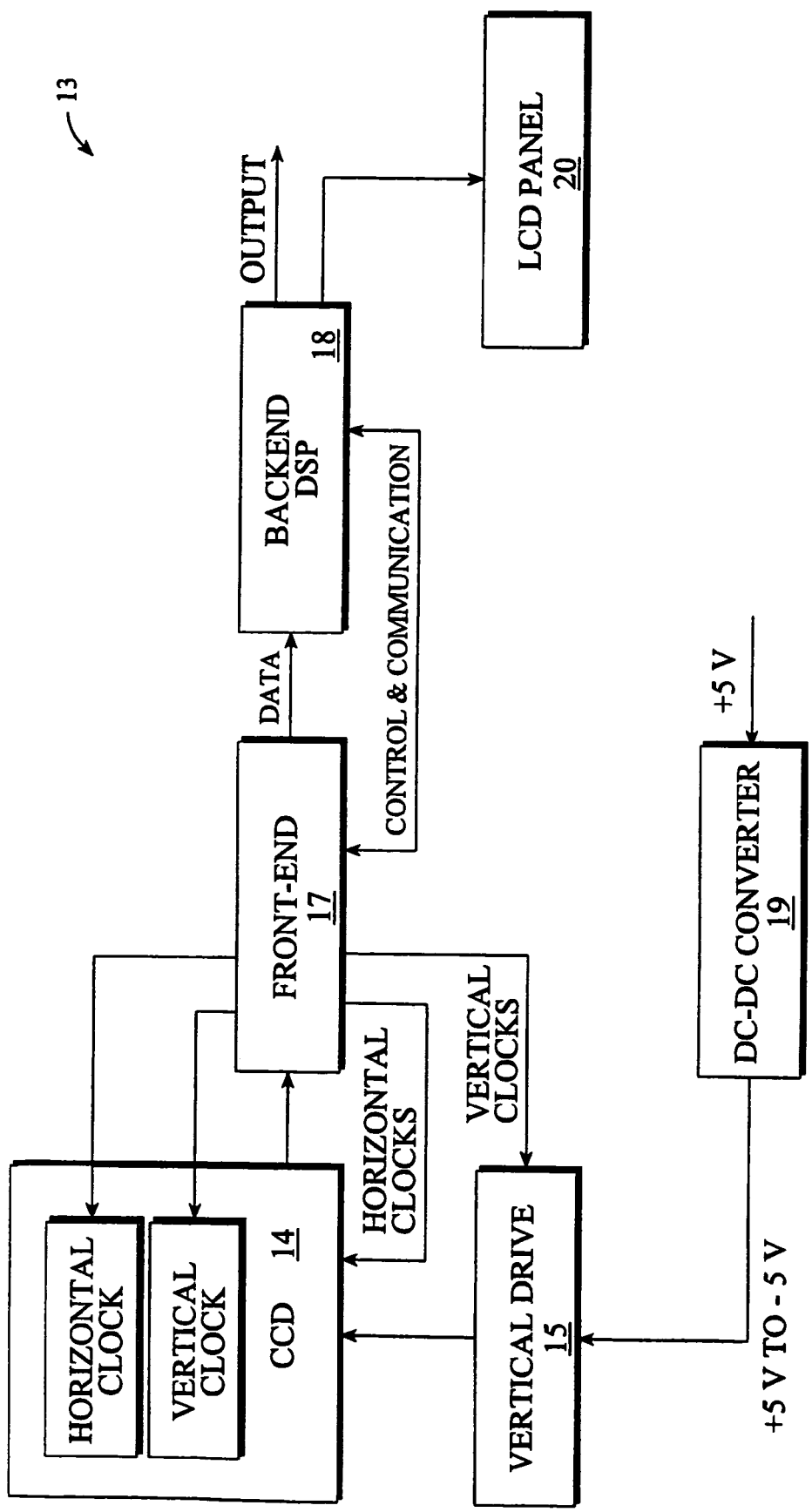
FIG. 1 is a block diagram of a CCD camera system according to the present invention, which includes a CCD system and an analog front end directly controlling the horizontal and vertical clocks of the CCD system.

FIG. 1 is a block diagram of a camera system 13, according to the present invention. As shown in FIG. 1, camera system 13 according to the present invention includes the following integrated circuit (IC) components, according to one embodiment of the present invention: a CCD array sensor 14, a vertical driver circuit 15, first and second signal processing subsystems (SPS) 17 and 18 (i.e., a front-end and a back-end subsystem), a DC-to-DC converter 19, and a display system such as for example without limitation a liquid crystal display (LCD) panel 20. The LCD panel 20 is connected to second SPS 18 for receipt of a digital signal input. First SPS 17 is an analog signal processing (ASP) front-end (AFE) system which receives and processes video samples from the CCD array sensor 14 and generates timing clocks and pulses required by the CCD array sensor 14, and vertical driver circuit 15. The vertical driver circuit 15 generates high voltage vertical shift register clock signals provided to CCD array sensor 14. The video output of the CCD array sensor 14 is directly connected to the input of the first SPS 17 through an emitter-follower and AC coupling capacitor. DC-to-DC converter 19 receives unregulated 5 volts DC and produces first and second regulated output voltages at 5 and −5 volts.

Figure 2:
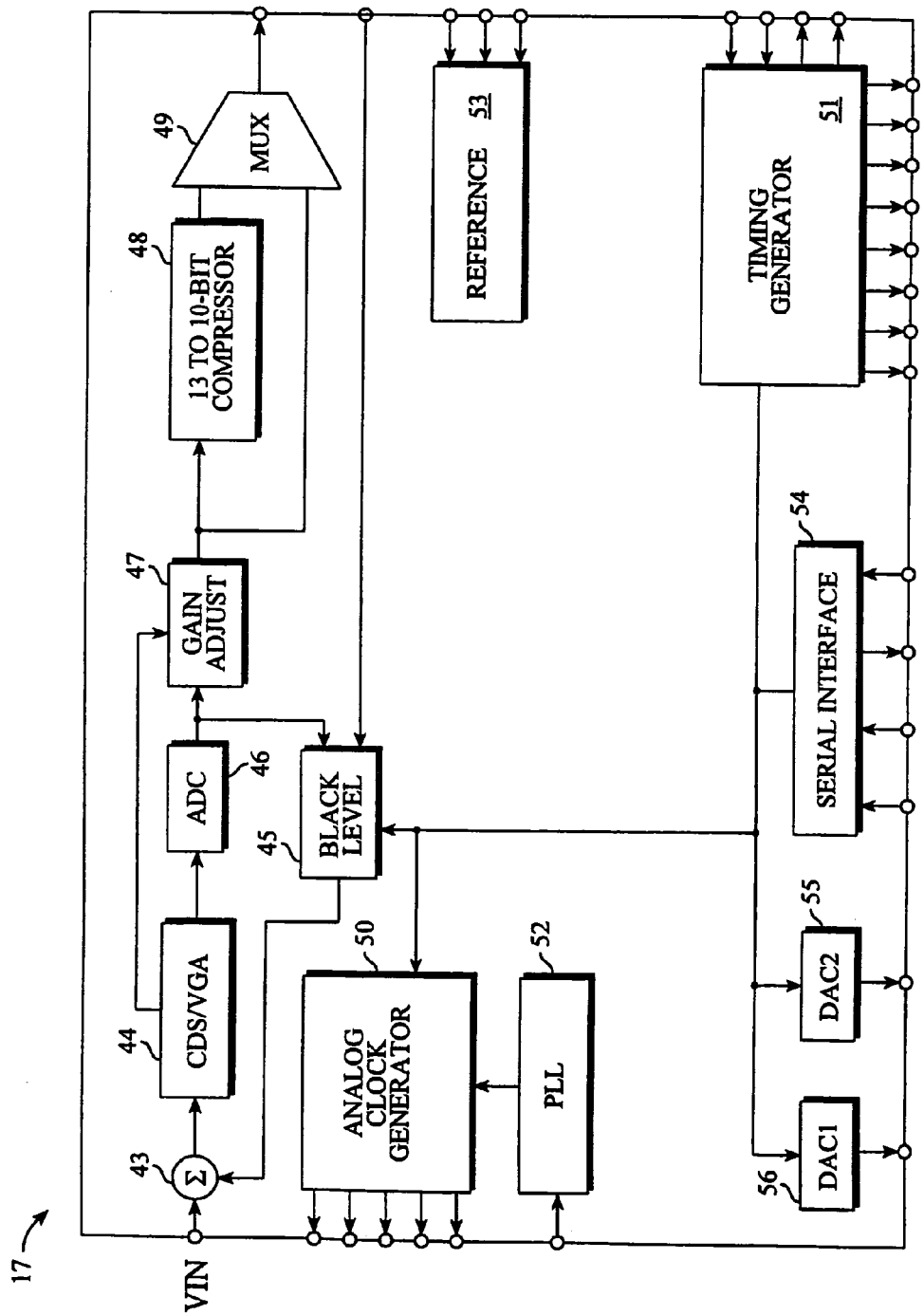
FIG. 2 is a block diagram of an analog image processing subsystem (AIPS) according to the present invention, in which an analog clock generator driven by a phase lock loop produces high frequency horizontal pixel timing signals which control the receipt of pixel intensity values from horizontal rows of picture elements in a CCD array, further including a programmable master timing generator which provides relatively low frequency (compared to the high frequency horizontal pixel timing signals) vertical timing signals determining which horizontal pixel line is currently being swept for pixel intensity values, which provides first and second digital-to-analog converters (i.e., "DACs") which produce programmable output currents to apply static bias values for the CCD array, and which provides a serial interface for control of these current values from a selected one or more of the DACs to the CCD array.

FIG. 2 is a block diagram of the first signal processing system (SPS) 17 according to the present invention. The Figure particularly shows a block diagram of an analog image processor subsystem (AIPS) referred to generally as front-end in accordance with one embodiment of the present invention. First SPS 17 includes a summation node 43, a correlated double sampler and variable gain amplifier (CDS-VGA) circuit 44 receiving data in the form of an input voltage (VIN) from an image acquisition device (or imager), such as are conventionally known, an analog-to-digital converter (ADC) 46 connected to CDSVGA circuit 44, a black level adjustment circuit (BLAC) 45 feeding back to the summation node 43, a gain adjustment circuit 47, a 13 to 10 bit compressor circuit 48, and a multiplexer circuit 49 for permitting selection of outputs between the compressor circuit 48 and gain adjustment circuit 47. Gain adjustment circuit 47 is connected at its input to ADC 46 and at its output to compressor circuit 48. AIPS 17 additionally includes an analog clock generator circuit 50, a timing generator circuit 51, a phase lock loop (PLL) circuit 52, a reference circuit 53, a serial interface circuit 54, and first and second digital-to-analog converters 55 and 56. Gain adjustment circuit 47 is controlled by CDSVGA circuit. PLL circuit 52 contributes to control of analog clock generator circuit 50. Timing generator circuit 51 provides timing signals to external circuitry (not shown). Serial interface 54 is connected for communication with black level circuit 45, analog clock generator 50, PLL 42, DAC1 56, and DAC2 57.

Figure 3:
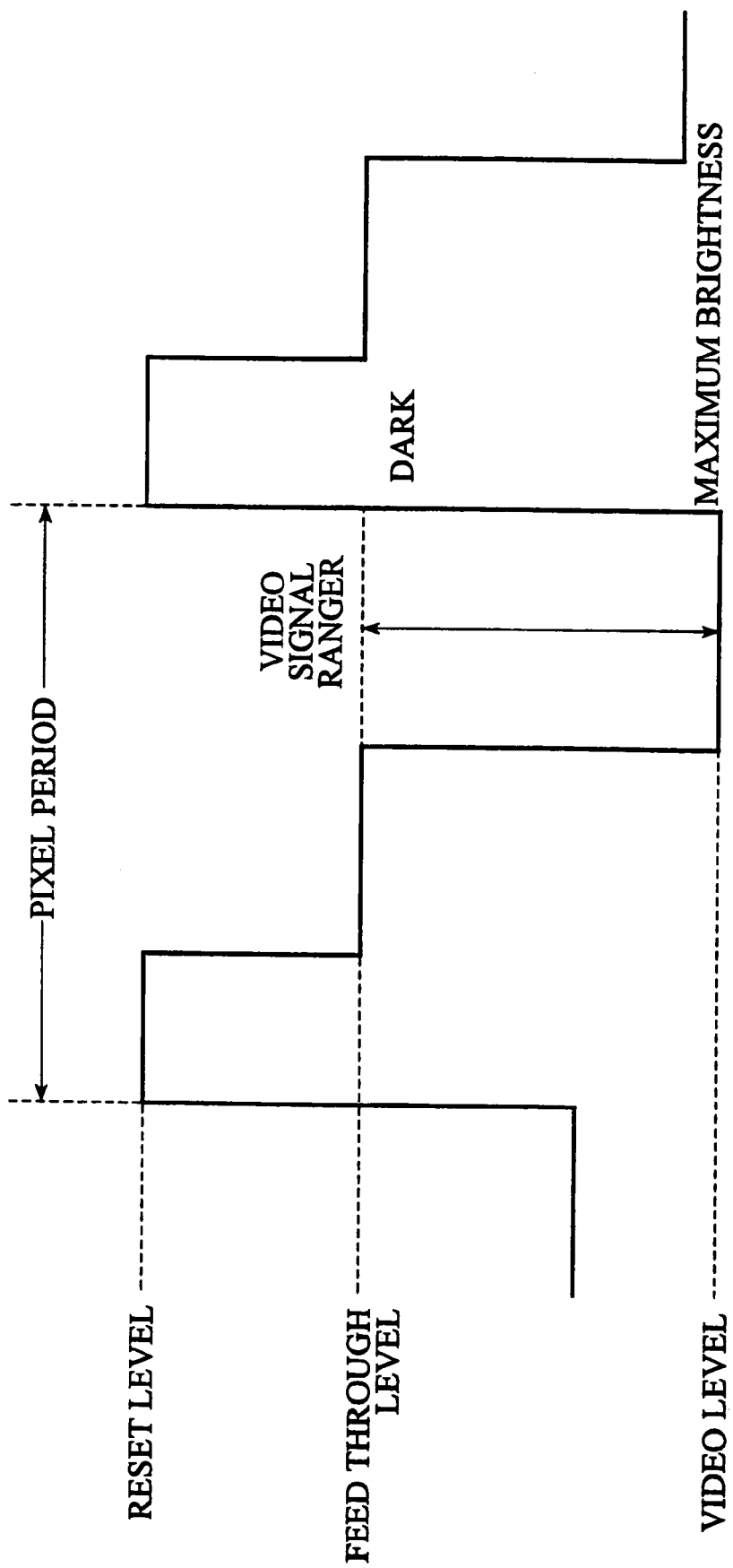
FIG. 3 is a diagram of an ideal output waveform of a selected imager, which is processed in accordance with one embodiment of the present invention.

FIG. 3 is a diagram of an ideal output waveform of a selected imager, which is processed in accordance with one embodiment of the present invention. Referring specifically to FIG. 3, there is shown a diagram of an ideal output waveform of a selected imager used in connection with the present invention. Correlated double sampling according to the present invention is accomplished by receiving imager output signal which includes reset noise, thermal noise, and 1/f noise, that are generated by the imager. The noise received degrades the S/N ratio and is canceled by correlated double sampling according to the present invention. Noise received during the active video portion of the CCD signal is assumed to be correlated with the noise originating during the feed-through portion of the signal. This noise is canceled by subtracting the feed-through level from the video level with correlated double sampling according to the present invention. The active video signal is the difference between feed-through and video levels according to the present invention. The active video signal varies according to light conditions. In order to insure that the full dynamic range of the ADC 46 is utilized even under low light conditions, the imager output is amplified using a variable gain amplifier (VGA).

Figure 4:
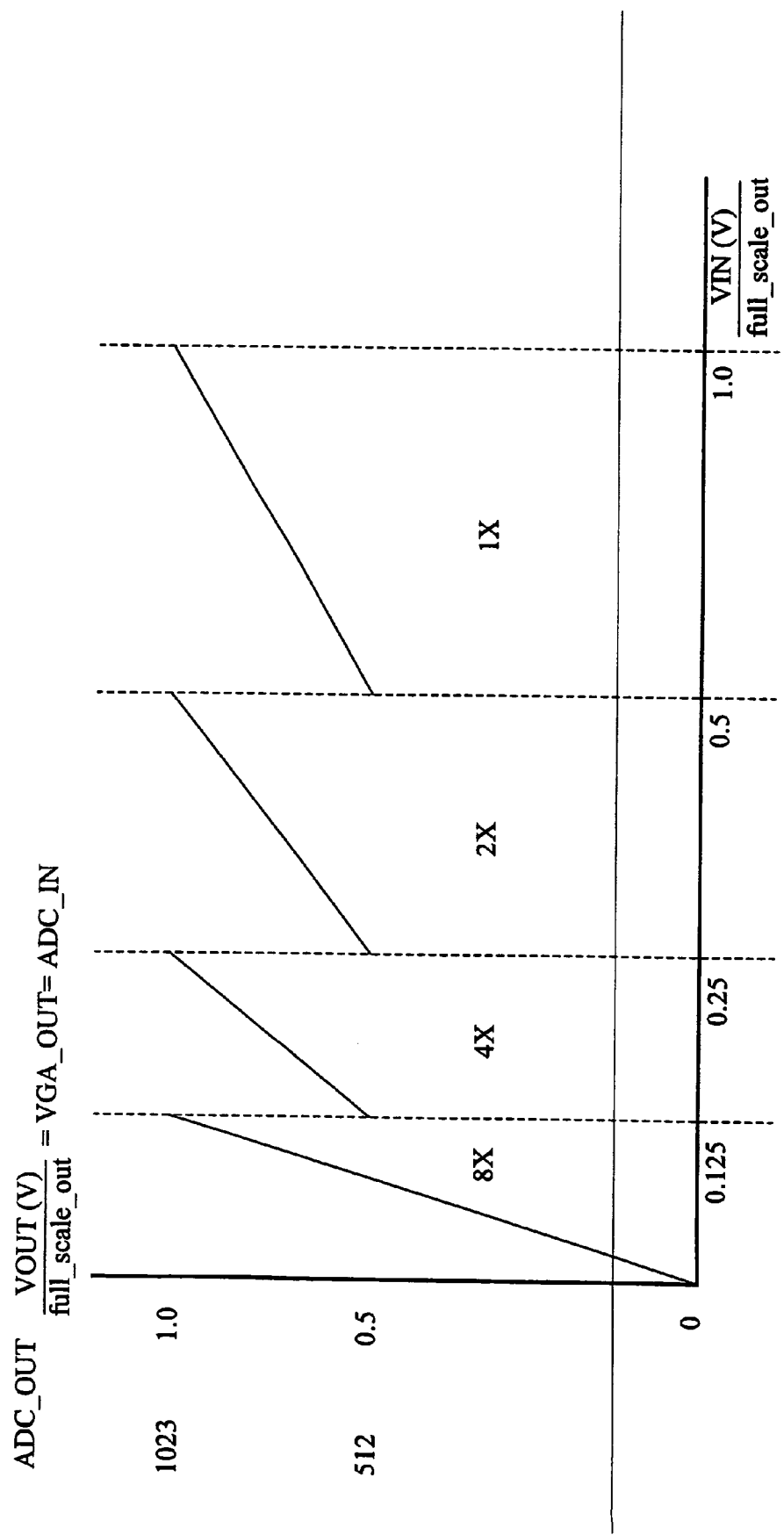
FIG. 4 is a diagram of the transfer function of a VGA circuit according to one embodiment of the present invention.

FIG. 4 is a diagram of the transfer function of a CDS/VGA circuit 44 according to one embodiment of the present invention. In particular, FIG. 4 is a graph of the output of CDS/VGA circuit 44 for selected gain settings of 1×-8×, according to one embodiment of the present invention. The Figure expresses the relationship between VGA_OUT and ADC_OUT. Specifically, the VGA_OUT full-scale range maps to code 0 to code 1023 at ADC_OUT (i.e., VGA_OUT=ADC_IN). The ADC_OUTPUT, i.e., the output of the analog-to-digital converter 46, can range from zero to full-scale (i.e., from code zero to code 1023) while VGA_INPUT values range from zero to about 0.125 at a gain setting of 8×. Alternatively, the output of the analog-to-digital converter 46, can range from half-scale to full-scale (i.e., from code 512 to 1023) when the VGA_INPUT values range from about 0.125 to about 0.25 at a gain setting of 4×. In another case, the output of the analog-to-digital converter 46, can range from half-scale to full-scale, while the VGA_INPUT ranges from about about 0.25 to about 0.5 at a final gain setting of 2×. In another case, the output of the analog-to-digital converter 46, can range from half-scale to full-scale, while the VGA_INPUT ranges from about 0.5 to about 1.0 at a gain setting of the CDS/VGA 44 of 1×. In operation according to the present invention, the highest possible gain setting is selected for a particular VGA input signal. When a trip point is reached at which the VGA input corresponds to an out-of-range ADC output value, e.g., greater than code 1023, the VGA gain is reduced to a next lower level, which is one half of the immediately prior gain. The trip points lie at regularly spaced intervals from each other, for example at VGA input values which are double the value of the next lower valued trip point. As the VGA input increases in value beyond a particular trip point, the gain of the CDS/VGA 44 is cut in half, resulting in a halved ADC 46 output level. For example, when the ADC output reaches approximately 1023 according to one embodiment, the output level of the ADC 46 abruptly drops to one half of 1023, i.e., approximately to 512, as the gain of the VGA is suddenly cut in half. The gain adjust block is used after the ADC to back out or perform the reverse operation of what is done in the VGA. For example, if a gain of 8 is applied in the VGA, the gain adjust block shifts the output by 3 bits to the right, thus performing a divide-by-8 operation. Accordingly, whatever gain is applied in the VGA, the gain adjust block applies the inverse of this gain. As a consequence, the output of the gain adjust block contains 13 bits, and the dynamic range of the 10-bit ADC is increased by 3 bits.

Figure 5:
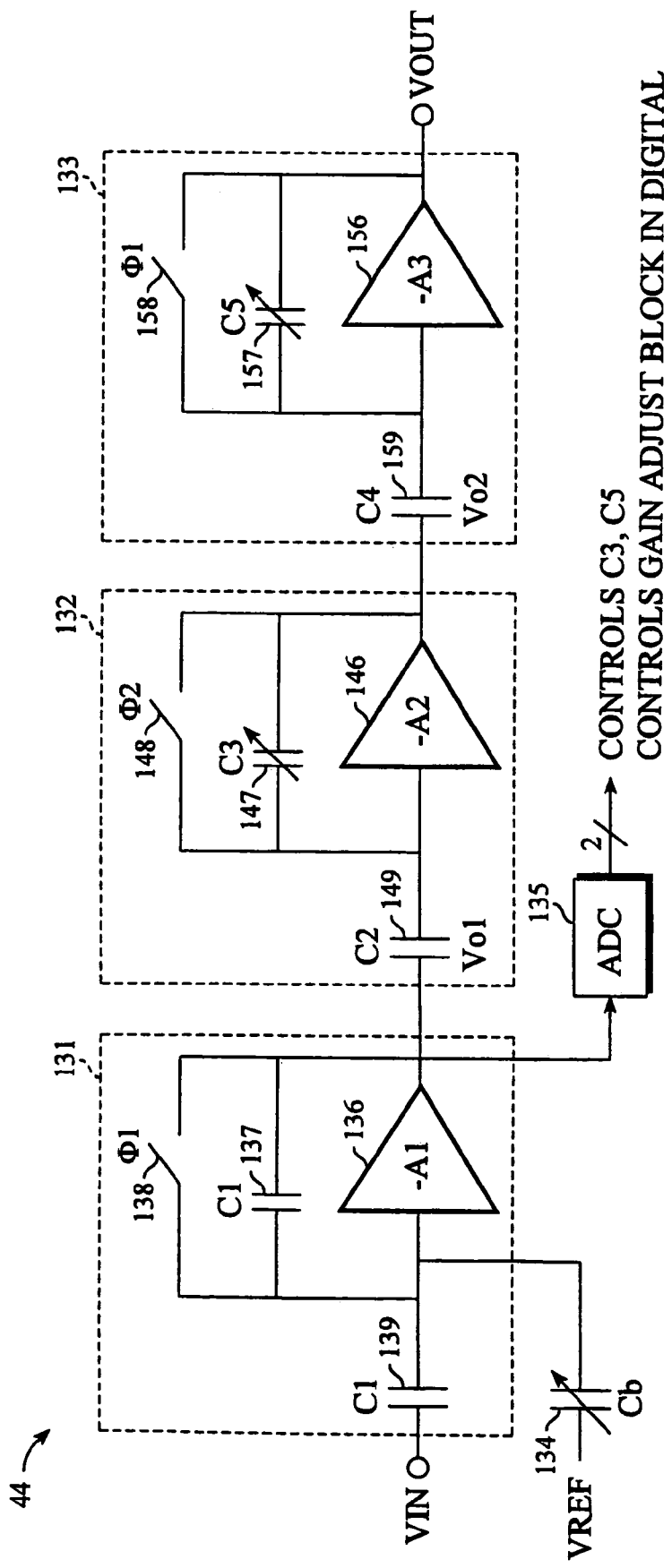
FIG. 5 is a block diagram of a correlated double sampling variable gain amplifier (CDS/VGA) for an analog data processing subsystem according to the present invention.

FIG. 5 is a block diagram of a correlated double sampling variable gain amplifier (CDS/VGA) 44 for an analog data processing subsystem according to the present invention. Referring particularly to the Figure, there is shown a block diagram of CDS/VGA circuit 44 including first, second, and third CDS/VGA circuit stages respectively 131, 132, and 133, a variable capacitor 134 connected to VREF, and an analog-to-digital converter (ADC) 135, according to the present invention. First stage 131 includes a first amplifier 136 connected to variable capacitor 134; a fixed value capacitor 137 in parallel with first amplifier 136; a first switch 138 alternating between open and closed states in accordance with a clock φ1 in parallel with first amplifier 136; and a fixed value input capacitor 139 connected to Vin. According to one embodiment of the present invention, capacitors 137 and 139 have the same capacitance. Second stage 132 of the CDS/VGA circuit 44 includes a second amplifier 146; a variable value capacitor 147 in parallel with second amplifier 146; a second switch 148 alternating between open and closed states in accordance with a clock φ2 in parallel with second amplifier 146; and a fixed value input capacitor 149 connected to the output of first amplifier 136. The third stage 133 of the CDS/VGA circuit 44 includes a third amplifier 156; a variable value capacitor 157 in parallel with third amplifier 156; a third switch 158 alternating between open and closed states in accordance with a clock φ1 in parallel with third amplifier 156; and a fixed value input capacitor 159 connected to the output of second amplifier 146. The total gain of the CDSVGA circuit 44 according to the present invention is A=(C2/C3)*(C4/C5) and is adjustable according to the present invention by varying C3 and C5. CDS/VGA circuit 44 according to the present invention uses a two phase non-overlapping clock to perform the indicated CDS functions. The two phase clock according to the present invention also allows image signals to be passed to the output while maintaining a positive polarity signal. First stage 131 performs correlated double sampling (CDS) as follows. When clock φ1 is high, the feed-through level is sampled across first capacitor C1, and the output of the first stage is forced to a predetermined reference voltage level. When clock φ1 falls, the output voltage Vo1 of first amplifier 136 follows the input. Second stage 132 operates similarly, except that its switch is controlled by the second phase of the two phase non-overlapping clock. This adds a half clock delay, which is effective to maintain a positive output voltage with respect to the reference level. Third stage 133 operates similarly, but adds another half clock delay.

Figure 6:
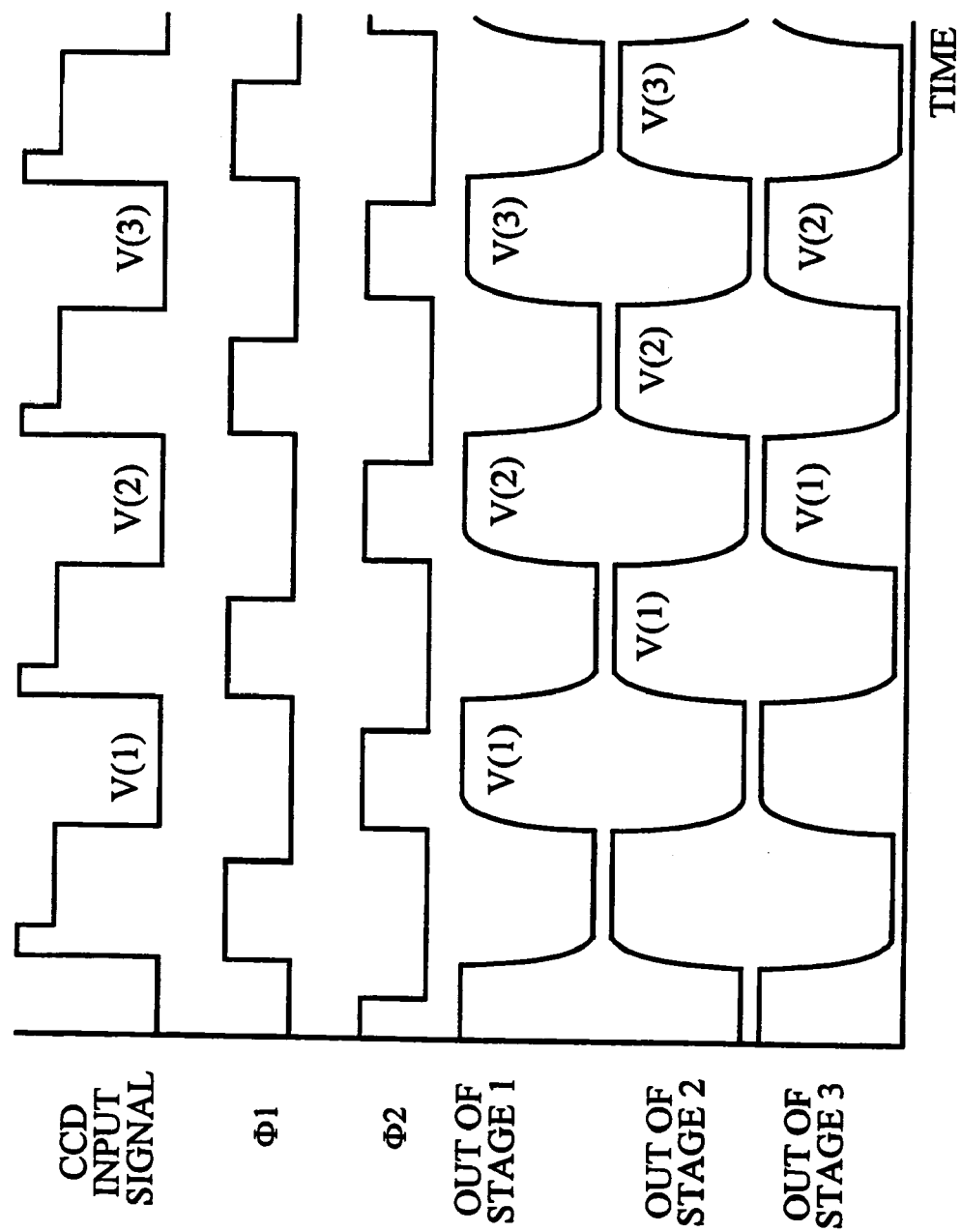
FIG. 6 is a timing diagram of the operation of a correlated double sampling variable gain amplifier (CDS/VGA) operating with a two phase clock according to an embodiment of the present invention.

FIG. 6 is a timing diagram of the operation of a correlated double sampling variable gain amplifier (CDS/VGA) 44 operating with a two-phase clock according to an embodiment of the present invention. Referring now to FIG. 6, there is shown a timing diagram of the two-phase clock of CDS/VGA circuit 114 and the imager signal, and the output signals of the first, second, and third stages, respectively 131, 132, and 133. In particular, the falling edge of φ1 occurs just before the transition from feed-through to active video, for example v(1), of the CCD input signal. The falling edge of clock φ2 occurs just before the transition from active video to reset of the CCD input signal. Clocks φ2 and φ1 are non-overlapping clocks. The output of stage 1 follows the CCD input, when φ1 is low. The output of stage two follows the output of stage 1, a half clock cycle earlier in time, when φ2 is low. The output of stage 3 follows the output of stage 2 from a half clock cycle earlier in time when φ1 was low.

Figure 7:
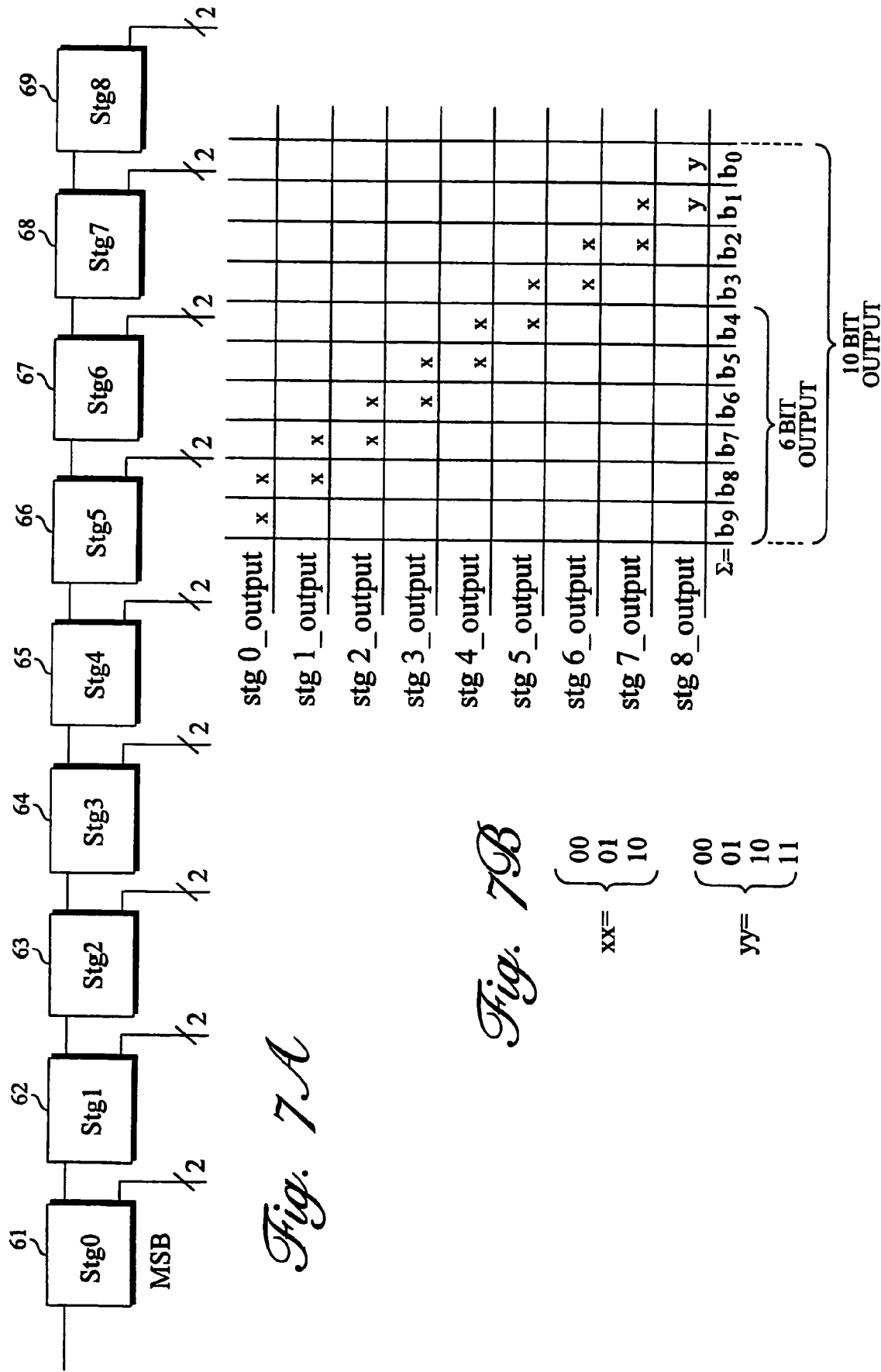
FIG. 7A is a block diagram of an analog-to-digital converter according to one embodiment of the present invention.
FIG. 7B is a diagram according to the present invention, which shows different levels of resolution output from an ADC, depending upon whether low significant value stages of the ADC are engaged for operation or disengaged.

FIG. 7A is a block diagram of an analog-to-digital converter (ADC) 46 according to one embodiment of the present invention. In particular, the ADC 46 is a 10-bit pipelined ADC which includes nine ADC stages respectively 61-69, of which the last four stages 66-69 are turned off during the preview mode of operation in accordance with the present invention. Accordingly, the data from the ADC 46 during preview mode is of reduced resolution—a reduction, however, which is not apparent to the viewer of LCD panel 20, because the resolution level of LCD panel 20 is inherently hardware limited to a lower level, for example commonly about 6-bits.

FIG. 7B is a diagram according to the present invention, which shows different levels of resolution output from ADC 46, depending upon whether low significant value stages of ADC 46 are engaged for operation or disengaged. The diagram particularly expresses the relationship between stages of ADC 46 and the output bits from the ADC 46. Each stage of ADC 46 outputs 2 bits. The two bits output by stg8 have a bit significance of LSB+1 and LSB. Each other stage's output has a significance that is twice the value of the subsequent stage's output. In equation form, this is understood as: $stgx\_output = two\_bit\_output * 2^{(8-x)}$. The output bits of ADC 46 are thus found by adding the outputs of all of the stages together, with their proper significance. When in preview mode, stg5-stg8 are powered down, and their outputs go to "00". Thus, bits $b_3$-$b_0$ are always "0000" in preview mode and accordingly contain no information. Thus, the additional resolution which would be provided by stages 5-8 is suppressed, as it would not have been relied upon in the expression of information on the face of LCD panel 20. By turning off the indicated stages of ADC 46, considerable power and battery savings are made, resulting in improved performance system-wide.

Figure 8:
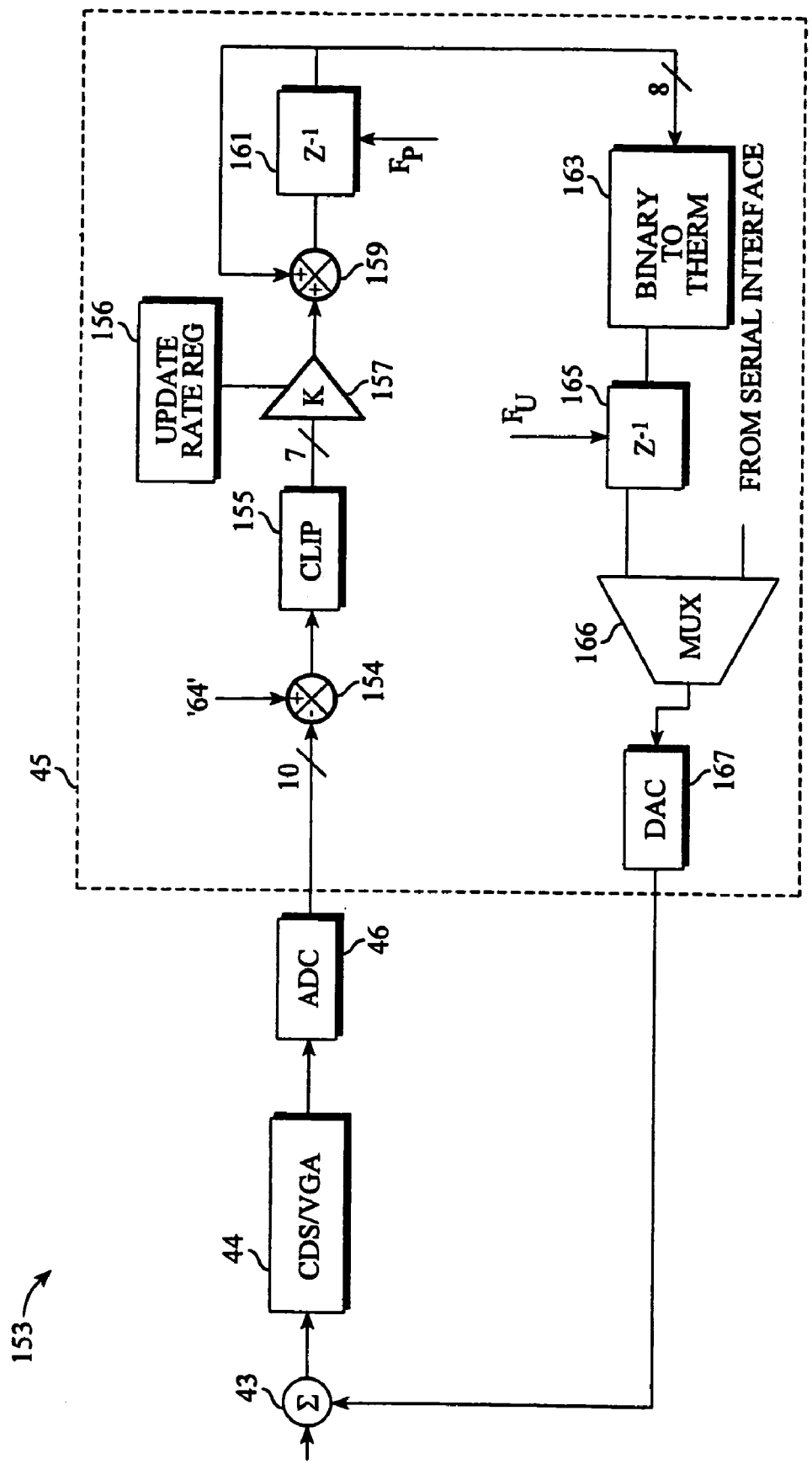
FIG. 8 is a block diagram of a black level adjustment circuit (BLAC), according to the present invention.

FIG. 8 is a block diagram of a subcircuit 153 of first SPS 45 including black level adjustment circuit (BLAC) 115, according to the present invention. More particularly, subcircuit 153 includes summation node 43, CDS/VGA 44, ADC 46, and BLAC 45 according to the present invention. BLAC 45 includes a first summer element 154, a clip circuit 155, an update rate register 156, an amplifier 157 with a gain factor K, a second summer element 159, a first unit delay element 161 having a transfer function $Z^{-1}$, a binary-to-thermometer converter 163, a second unit delay element 165 having a transfer function $Z^{-1}$, a multiplexer 166, and a digital-to-analog converter 167. First summer element 43 is connected to CDS/VGA 44, which in turn is connected to ADC 46. ADC 46 in turn is connected to summation node 154. ADC 46 converts output signals from CDS/VGA 44 into digital form. Clip circuit 155 receives a 10 bit signal from summer 154 and clips it to a 7 bit signal according to one embodiment. Amplifier 157 amplifies the output signal from clip circuit 155 by a factor of K, which is a selected amplification factor. Second summer element 159 receives the amplified output of amplifier 157. First unit delay element 161 receives the output of second summer element 159. Binary-to-thermometer circuit 163 and second summer element 159 are connected to the output of first unit delay element 161. Second unit delay element 165 receives the output of binary-to-thermometer circuit 163 at a selected line frequency and connected at its output is multiplexer 166 which in turn is connected to DAC 167, which is connected to first summer element 43. In order to maintain a constant reference level for black pixels according to the present invention, a feedback loop is implemented to set the output of ADC 46 to the 10 bit digital code 64. This loop is active when optically black pixels are output. The presence of black pixels in the CCD output is indicated by a CLAMP pulse. The open loop transfer function of the black level adjustment loop according to the present invention is $H(z) = Kn/(z-1)$ where K and n are programmable values equal to the gain and K is the number of black pixels during a selected clamp period, respectively. The 8 most significant bits (MSBs) of the black level accumulator are read or written through the associated register. If written, the least significant bits (LSBs) are set to 0. The clamp pulse used by the black level adjustment block is delayed according to the present invention from the actual clamp pulse, because of the latency of the ADC 46. The black level adjust loop can be disabled using an associated register.

Figure 9:
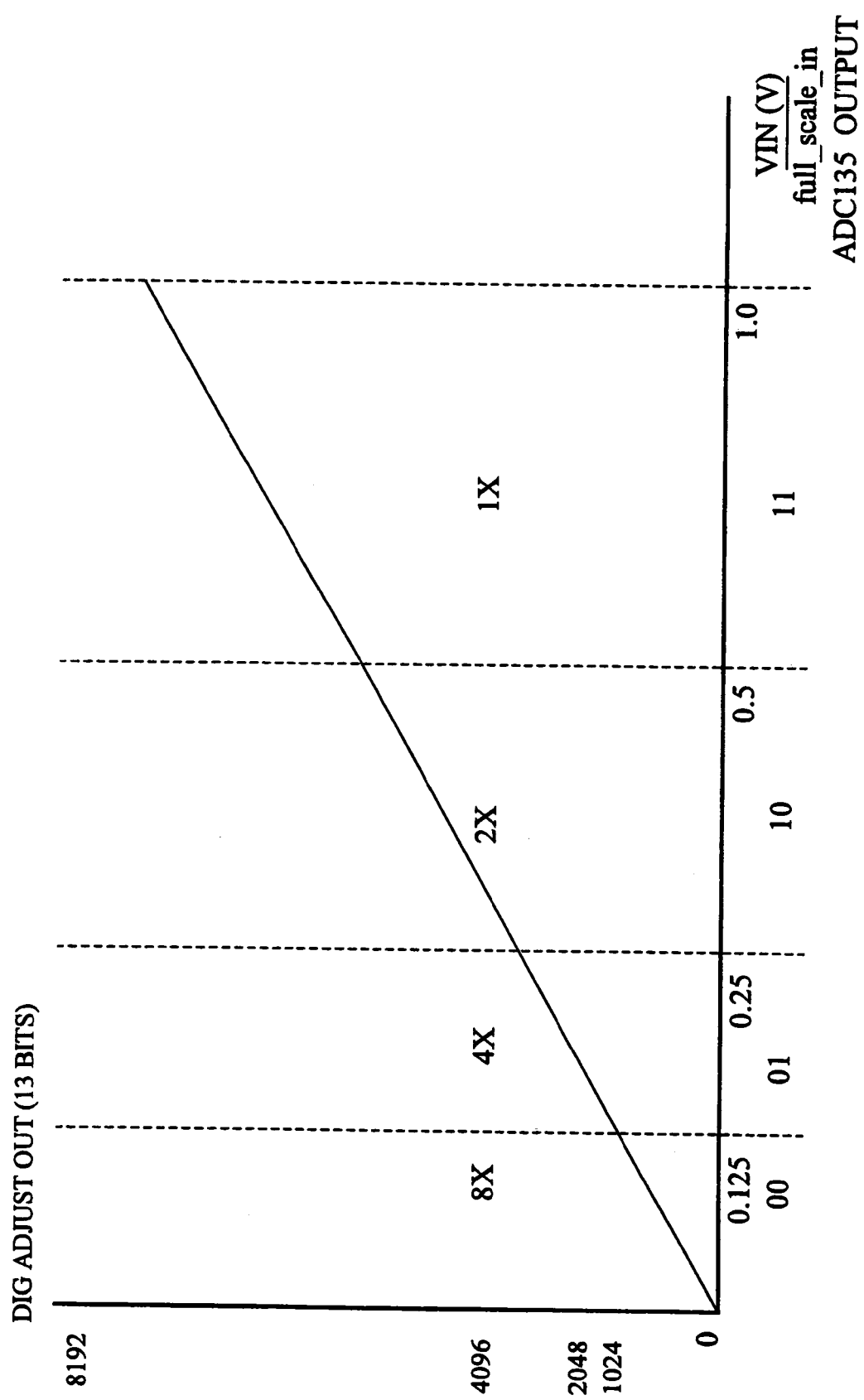
FIG. 9 is a diagram of a transfer function of the digitally adjusted 13-bit output as a function of ADC output, according to the present invention.

Referring now to FIG. 9, there is shown a transfer function of the digitally adjusted 13-bit output as a function of VGA_INPUT, according to the present invention. In particular, FIG. 8 is a graph of the digitally adjusted 13-bit output (DOUT) as a function of VGA_INPUT, with DOUT ranging from zero to 8192, according to one embodiment of the present invention. To express the DOUT range corresponding to a VGA_INPUT range from zero to about 0.125, a gain factor of 8× is employed. To express the DOUT range corresponding to a VGA_INPUT range from 0.125 to about 0.25, a gain factor of 4× is employed. To express the DOUT range corresponding to a VGA_INPUT range from 0.25 to about 0.5, a gain factor of 2× is employed. To express the DOUT range corresponding to a VGA_INPUT range from 0.5 to about 1.0, a gain factor of 1× is employed. As can be seen, the curve of DOUT is smooth, monotonic, and continuous, even at transitions associated with trip points. The normalized input point 1.0 marks the end-of-range for VGA input values, and does not represent a trip point according to this embodiment of the present invention.

Figure 10:
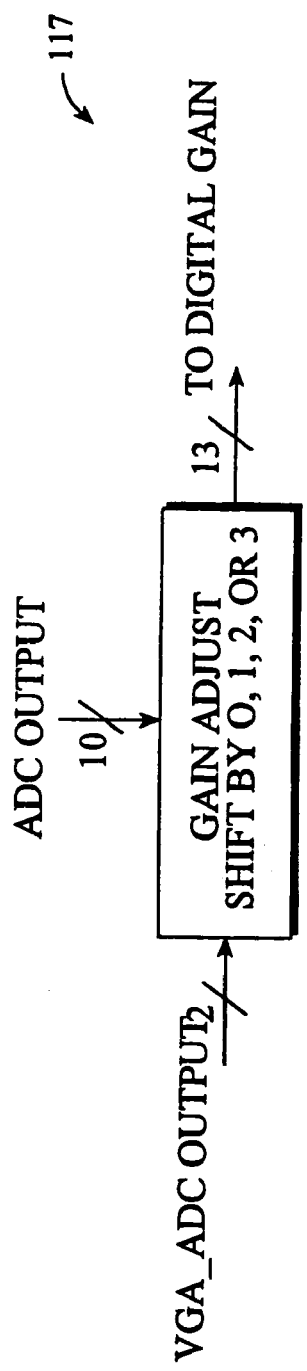
FIG. 10 is a block diagram of a gain adjustment system receiving first and second input signals respectively a 10-bit ADC output signal and a two-bit VGA_ADC output signal, and producing an up to 13-bit digital gain output signal, according to one embodiment of the present invention.

FIG. 10 is a block diagram of a gain adjustment system 117 receiving first and second input signals respectively a 10-bit ADC output signal and a two-bit VGA_ADC output signal, and producing an up to 13-bit digital gain output signal, according to one embodiment of the present invention. More particularly, there is shown a block diagram of a gain adjustment system which can accomplish gain adjustment shifts of 0, 1, 2, or 3, depending upon the value of a two-bit VGA_ADC output signal. According to another embodiment of the present system, more extensive gain adjustment shifts can be accomplished, by increasing the bit-width of the VGA_ADC output signal.

Figure 11:
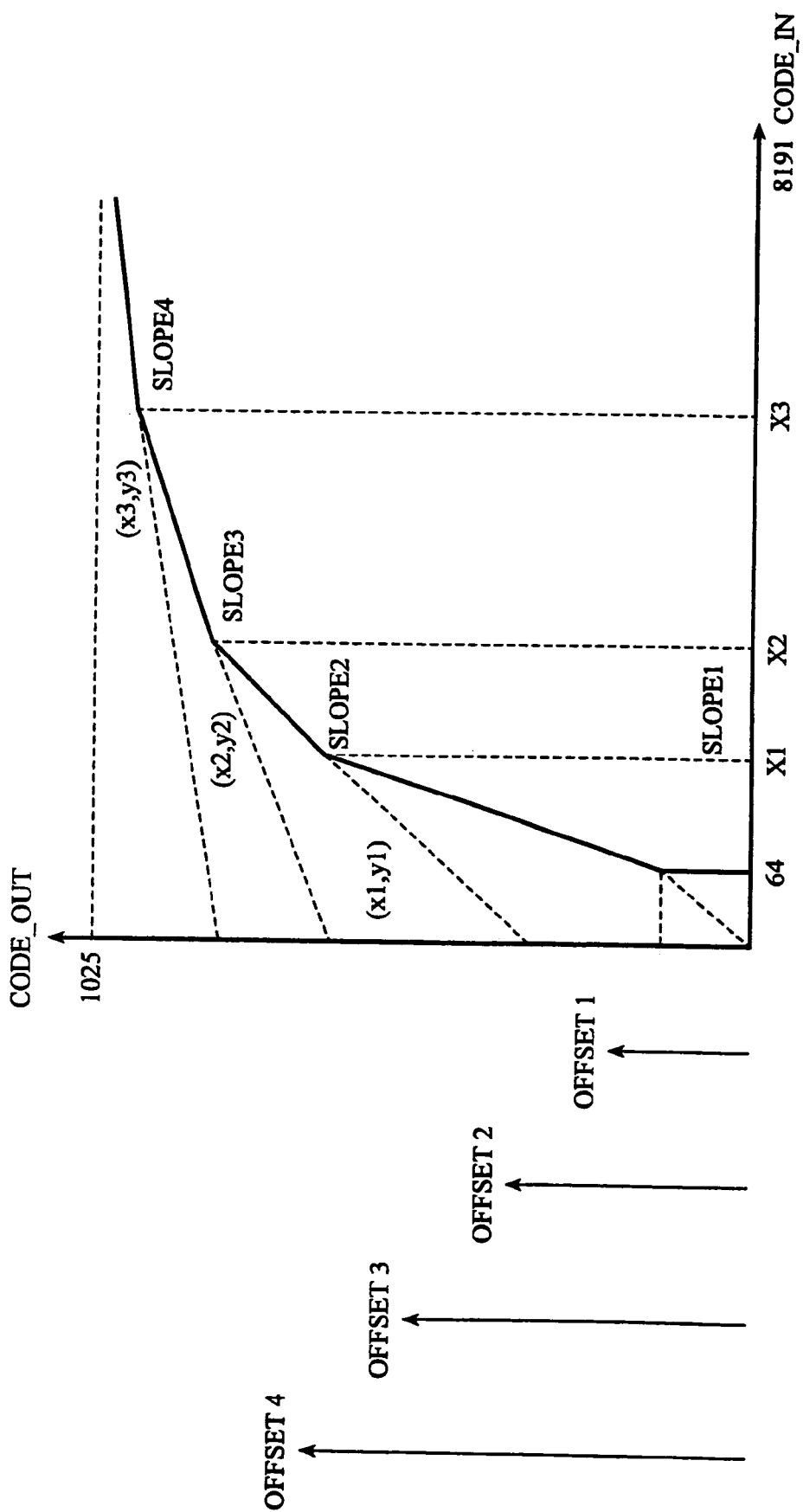
FIG. 11 is a diagram of the code output versus the code input for a 13-to-10 bit compander, according to the present invention.

FIG. 11 is a diagram of the code output versus the code input for a 13-to-10 bit compander 118, according to the present invention. While a 13 bit output is useful for some applications, others may require a 10-bit output. To accommodate this and yet retain the advantages of increased dynamic range according to the present invention, a 13-to-10 or 13-to-12 compander is included. By using the picture content as a guide, the user selects the curve which will lead to the best overall dynamic range in the picture. The companding module according to the present invention takes the 13-bit data as input, and outputs either 10-bit companded data, 12-bit data with the most significant bit clipped or it lets the original 13-bit data pass through. By programming the compander in the way shown in FIG. 11, it is possible to compensate for backlighting conditions. Details in dark areas stay visible accordingly, even in very complex lighting conditions. Three compander modes are selectable with two register bits, according to one embodiment of the present invention. In a 12-bit clipped mode according to the present invention, any input above 4095 gets clipped to 4095. In a 10-bit companded mode according to the present invention, the input gets companded through a four segment, three knee, programmable curve. To program the curve according to the present invention, the placement of the three knees in the companding curve are determined. Next, the slope of the four segments created by the three knees is determined. Finally, offsets are calculated to maintain continuity of the companding curve. A fourth knee in the curve represents the black level value. According to one embodiment of the present invention, blacker-than-black pixel information is maintained in a linear mapping, with black (code 64 in 13 bit data) being defined as code 8 in the 10 bit domain. According to another embodiment of the present invention, pixel values less than black are clipped to a programmable offset value. The clipped embodiment loses blacker-than-black information but increases dynamic range. In the case of a linear mode, offset1 is set to 8. According to the present invention, registers x1 through x3 are loaded with the respective knee coordinates. Registers slope1 through slope 4 are loaded with 256 multiplied by the calculated slopes.

Figure 12:
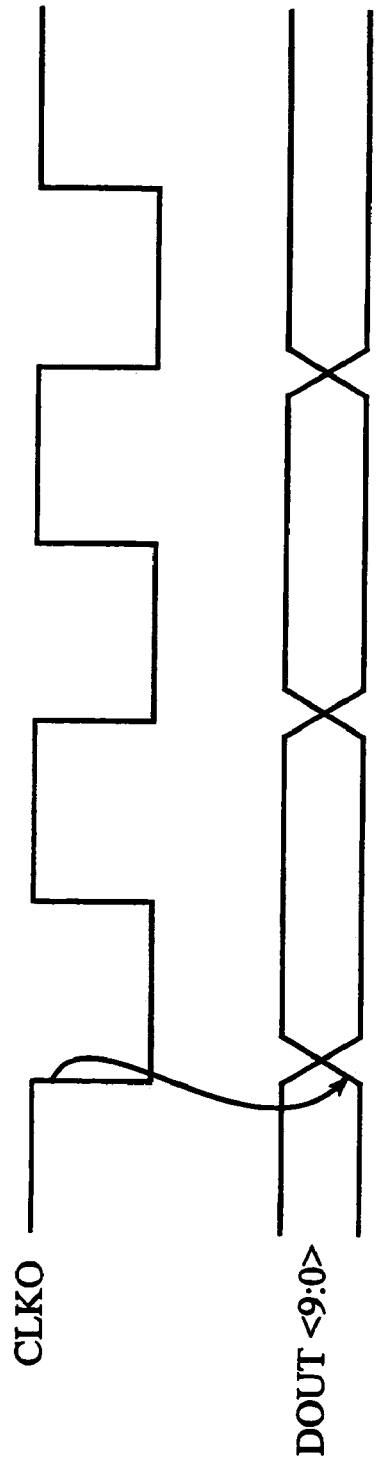
FIG. 12 is a diagram of output data and clock signals according to one embodiment of the present invention.

FIG. 12 is a diagram of output data and clock signals according to another embodiment of the present invention. The output of compander 118 is made available at pins DOUT<12:0>, and it makes transitions either at the falling or rising edges of the pixel rate clock, CLKO, controlled by a register bit. In particular, the Figure shows a falling edge embodiment of the present invention. According to one embodiment for outputting data according the present invention, the pixel rate clock is output on the CLKO pin. The polarity of the pixel clock out of the pin is programmable so that the user is able to choose either the clock edge to latch in the data. Based upon RD_OUTB and HSYNCHB signals, the user is able to determine when active pixels data is being output.

Figure 13:
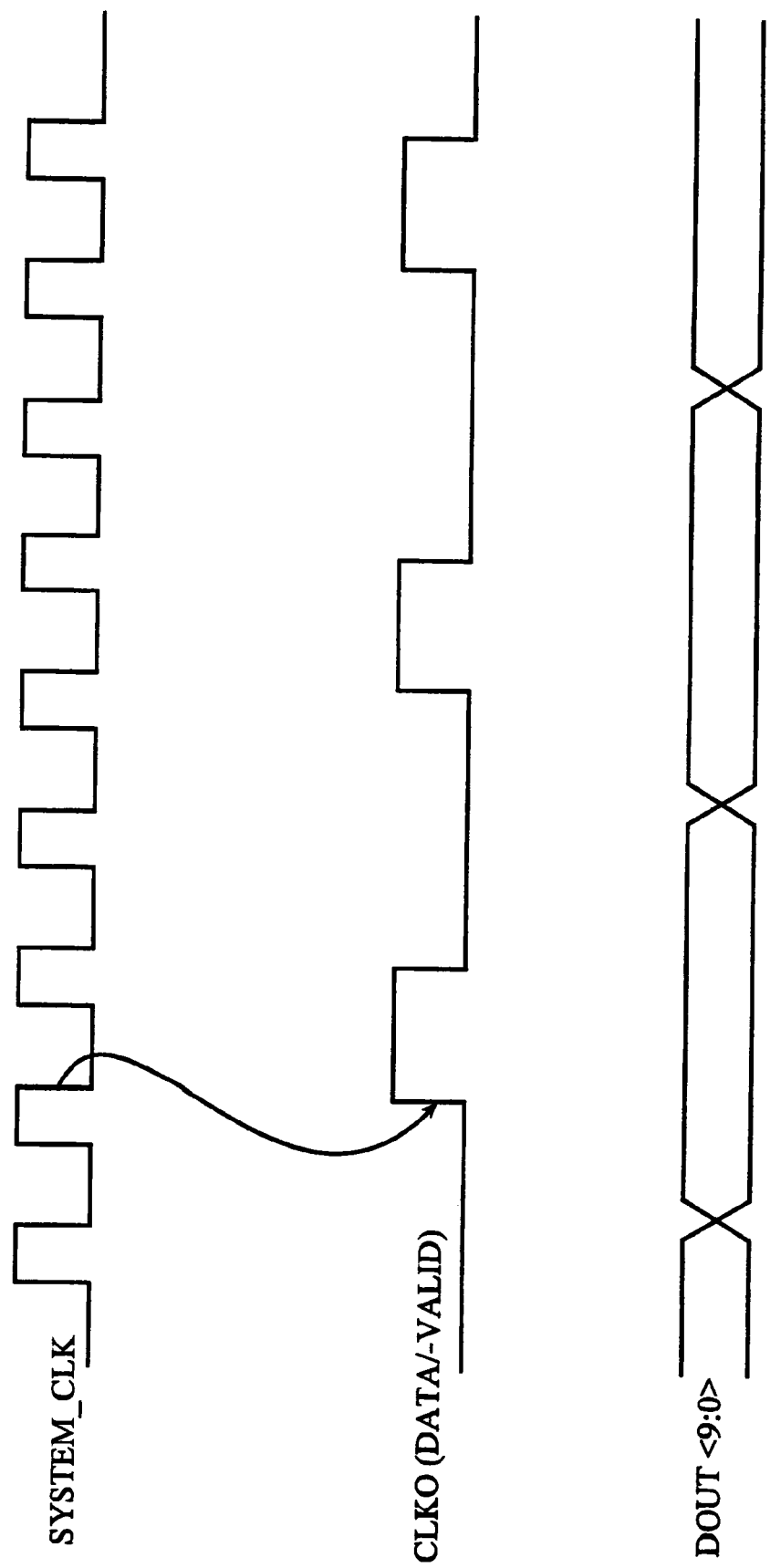
FIG. 13 is a diagram of output data and clock signals according to another embodiment of the present invention.

FIG. 13 is a diagram of output data and clock signals according to another embodiment of the present invention. According to this embodiment of the present invention, a data_valid signal is output on the CLKO pin that is synchronous with the input master clock, as shown in the Figure. The data_valid signal only toggles over active pixels. Accordingly, the user latches data during valid times.

Figure 14:
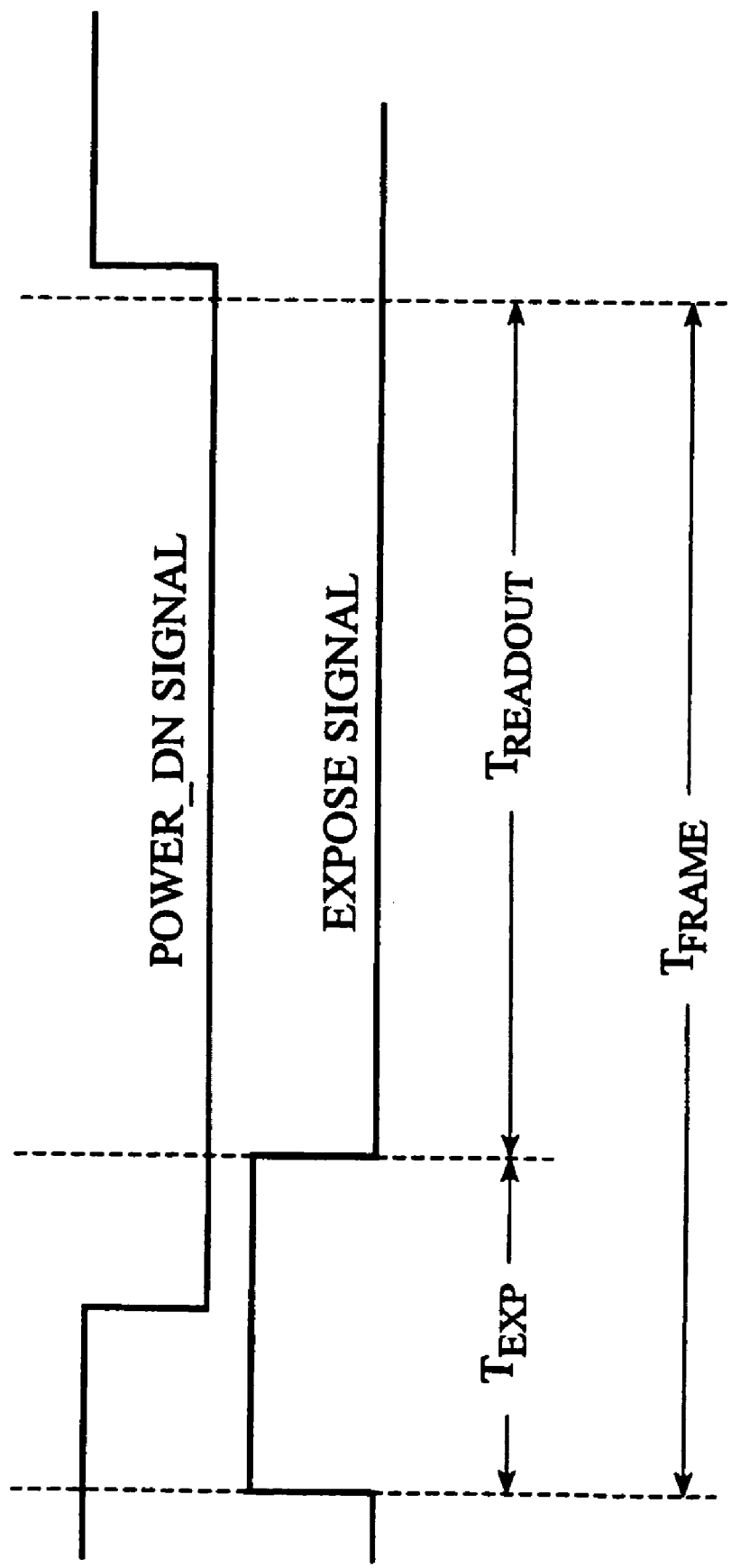
FIG. 14 is a diagram of signal timing for a timing master mode in accordance with operation according to the present invention.

FIG. 14 is a diagram of signal timing for a timing master mode in accordance with operation according to one embodiment of the present invention. To select this embodiment, the user ties the BYPASS_PLL pin low and selects a predetermined internal timing mode in the timing mode register. The system is the clock master, providing vertical outputs and horizontal outputs. According to this embodiment of the present invention, the user controls two signals, including first the master POWER_DN signal, and second, the EXPOSE signal. When POWER_DN is high, the chip powers down except for the DAC outputs. These are separately capable of being powered down when not in use, by register control. The EXPOSE signal goes high according to one embodiment, at the beginning of exposure and low at the beginning out readout, according to the timing shown in the Figure.

Figure 15:
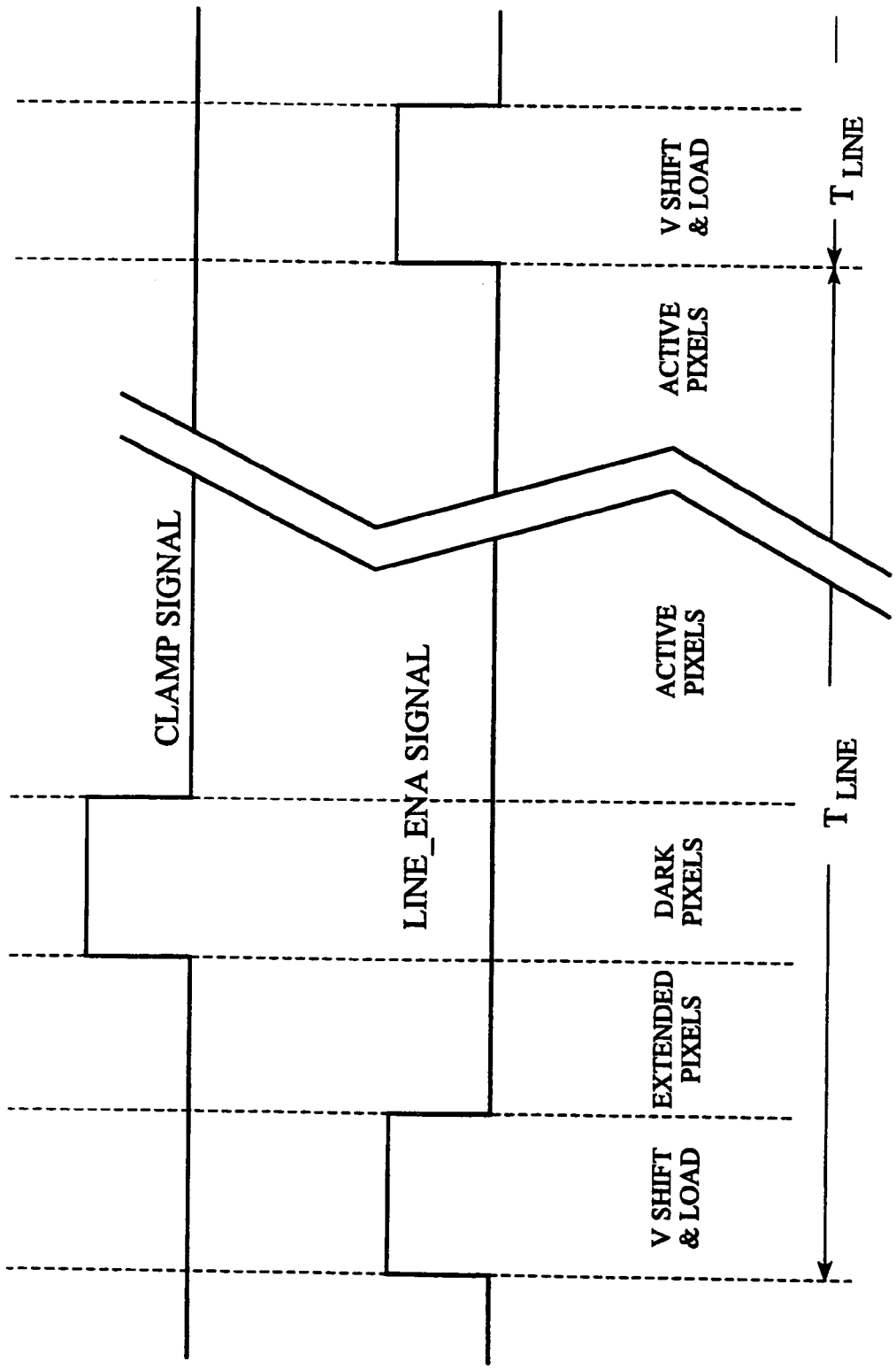
FIG. 15 is a timing diagram of a horizontal only mode according to the present invention.

FIG. 15 is a timing diagram of a horizontal only mode according to the present invention. To implement the horizontal only mode, the user sets the BYPASS_PLL pin low and selects external timing in the timing mode register. Accordingly, the chip becomes the master of the pixel rate timing, and frame and line timing is controlled externally. Further, the user controls POWER_DN, EXPOSE, LINE_ENA, and CLAMP signals. The master POWER_DN signal conserves power during non-readout times, according to the present invention. The EXPOSE pin is defines as the non-readout signal. The CLAMP pin is high when over a dark reference, i.e., black pixels. FIGS. 14 and 15 show the timing requirements for this embodiment of the present invention.

Figure 16:
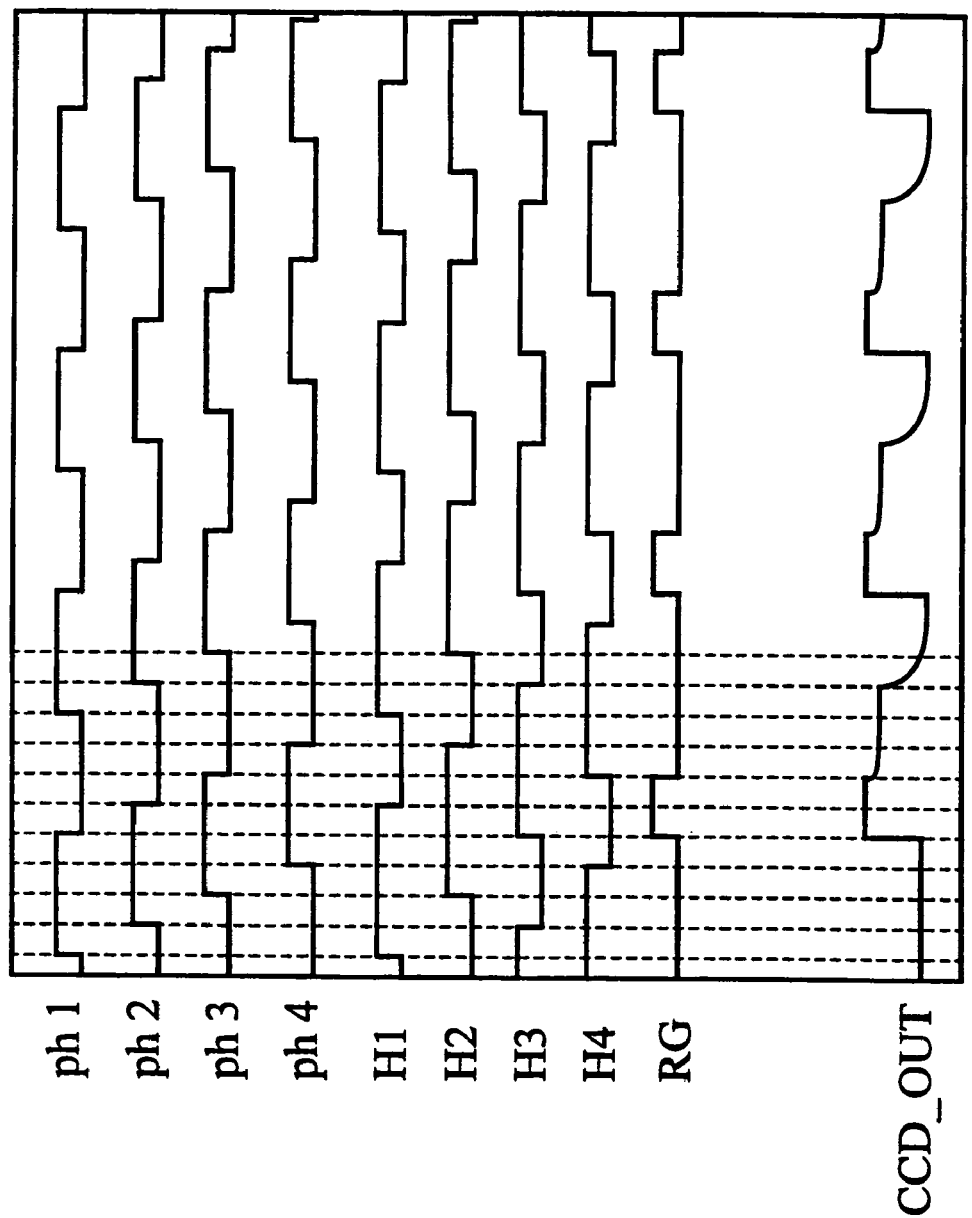
FIG. 16 is a timing diagram of a slave mode according to the present invention.

FIG. 16 is a timing diagram of a slave mode according to another embodiment of the present invention. In particular, according to this embodiment, the user sets the BYPASS_PLL pin high. Chip timing is then slaved from an external source and is supplied with sampling clocks for feedthrough and data. In this mode, the user controls POWER_DN, EXPOSE, CLAMP, CK_FT (i.e., CLOCK_IN), and CK_DT (LINE_ENA) signals. The master POWER_DN signal conserves power during non-readout times. The EXPOSE pin is defined as the non-readout signal. CLAMP is high over dark reference pixels. The CLOCK_IN and LINE_ENA pins are redefined as the CK_FT and CK_DT signals, to sample the feedthrough and data levels, respectively. The timing for POWER_DN, EXPOSE, and CLAMP signs is as shown in FIGS. 14 and 15. The timing for CK_FT (CLOCK-IN) and CK_DT (LINE-ENA) is shown in FIG. 16.

Figure 17:
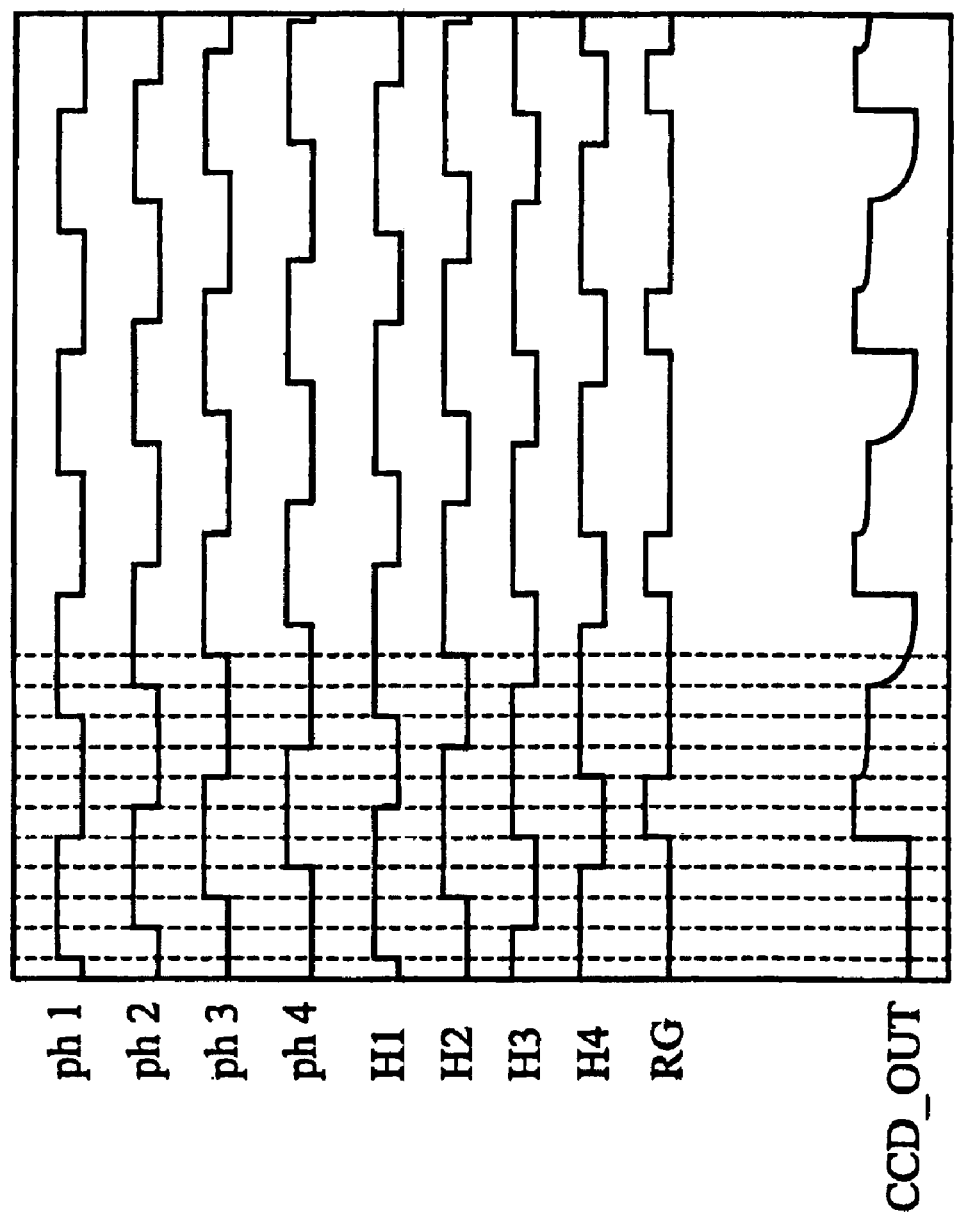
FIG. 17 is a timing diagram of clock phases available in a pixel period and a default timing diagram of horizontal signals to a CCD camera, according to one embodiment of the present invention.

FIG. 17 is a timing diagram of clock phases available in a pixel period according to one embodiment of the present invention. In particular, during a horizontal line period, the data from the horizontal shift register is shifted out on the CCD output pin one pixel at a time. The analog timing generator creates driving signals to control CCD horizontal timing and analog sampling signals. The timing signals include H1, H2, H3, H4, and RG. The timing can be controlled through a serial interface according to an embodiment of the present invention. The pixel period is broken into 8 equal time periods. By delaying the clock a given number of time periods, different phases are created, as shown in the Figure. Using the four clocks and their complements, the user may set the rise and fall edges of each horizontal pixel clock to a selected one of eight phases. The Figure also shows the default timing diagram of horizontal signals to a CCD camera, according to one embodiment of the present invention.

In summary according to the present invention, a processing system for a charge coupled device (CCD) or CMOS imaging system includes a multi-mode, multiple current level, correlated double sample and variable gain (CDS/VGA) circuit for receiving data from a CCD system, subject to horizontal and vertical timing signals for the system which are locally generated by the processing system itself. The processing system particularly includes programmable timing circuitry for controlling the detection of pixel intensity values from elements of a two-dimensional pixel array, with a programmable low-frequency master vertical timing circuit driving a high-frequency horizontal timing circuit, wherein the vertical and horizontal timing signals are independently locally provided to the array from the analog processor actually sampling the array. The architecture of the processing system further includes a black level clamp and a low-power mode analog-to-digital converter (ADC) having a selectable bit-width output and coupled to said VGA circuit, and a gain circuit coupled to said ADC. The single chip analog front end produces digitized CCD data in a bit formats corresponding to selected current level and data resolution. The VGA amplifier includes circuitry to enable selected data resolution levels to enable lower power operation at a reduced data resolution for video display on another viewing screen.

What is claimed is:

1. A method for implementing an analog-to-digital converter (ADC) for an analog front end circuit of an image processing system, comprising:
    de-activating stages of an analog-to-digital converter (ADC) for an analog front end circuit of an image processing system during a reduced resolution mode.

2. The method according to claim 1, wherein de-activating stages of an analog-to-digital converter (ADC), further comprises:
    de-activating lower stages which provide lower significant bits of a digital value.

3. The method according to claim 2, wherein de-activating lower stages further comprises:
    setting the lower significant bits to lowvalues wherein the lower stages in effect contain no information.

4. The method according to claim 1, wherein the reduced resolution mode is a preview operational mode and de-activating stages of an analog-to-digital converter (ADC), further comprises:
    de-activating stages of the ADC during the preview operational mode.

5. The method according to claim 1, further comprising:
    outputting two bits from each of the stages;
    outputting a bit significance of a least significant bit and a least significant bit plus one for a most significant bit stage;
    outputting another bit significance of twice an output value of a subsequent stage for each of the other stages; and
    outputting bits for the ADC by adding together the outputs of all of the stages.

6. An analog-to-digital converter (ADC) for an analog front end circuit of an image processing system, comprising:

analog-to-digital converter (ADC) stages for the ADC wherein at least some of the ADC stages are de-activated during a reduced resolution mode.

7. The ADC according to claim 6, wherein lower ADC stages which provide lower significant bits of a digital value are de-activated.

8. The ADC according to claim 7, wherein the lower significant bits are set to low values and the lower ADC stages in effect contain no information.

9. The ADC according to claim 6, wherein the reduced resolution mode is a preview operational mode.

10. The ADC according to claim 6, wherein:
each of the stages outputs two bits;
a most significant bit stage outputs a bit significance that is a least significant bit and a least significant bit plus one;
each of the other stages outputs another bit significance that is twice an output value of a subsequent stage; and
the ADC provides output bits by adding together the outputs of all of the stages.

11. A method for operating an image processing system between a reduced resolution mode and a normal resolution mode, comprising:
activating stages of an analog-to-digital converter (ADC) for an analog front end circuit of an image processing system that is operating in a normal resolution mode; and
de-activating at least some of the stages of the ADC when the image processing system is operating in a reduced resolution mode.

12. The method according to claim 11, wherein de-activating at least some of the stages of the ADC, further comprises: de-activating lower stages which provide lower significant bits of a digital value.

13. The method according to claim 12, wherein de-activating lower stages further comprises: setting the lower significant bits to low values wherein the lower stages in effect contain no information.

14. The method according to claim 11, wherein the reduced resolution mode is a preview operational mode and de-activating at least some of the stages of the ADC, further comprises:
de-activating stages of the ADC during the preview operational mode.

15. The method according to claim 11, further comprising:
outputting two bits from each of the stages;
outputting a bit significance of a least significant bit and a least significant bit plus one for a most significant bit stage;
outputting another bit significance of twice an output value of a subsequent stage for each of the other stages; and
outputting bits for the ADC by adding together the outputs of all of the stages.

* * * * *